Aug. 14, 1956 H. W. ZUCH ET AL 2,759,127
LIGHTNING ARRESTOR

Filed Aug. 20, 1952 2 Sheets-Sheet 1

INVENTORS
H. W. ZUCH &
H. A. TANKERSLEY
ERNEST T. ANKELE

BY Gustave Miller
ATTORNEY

Aug. 14, 1956 H. W. ZUCH ET AL 2,759,127
LIGHTNING ARRESTOR
Filed Aug. 20, 1952 2 Sheets-Sheet 2

INVENTORS
H. W. ZUCH &
H. A. TANKERSLEY
ERNEST T. ANKELE
BY Gustave Miller
ATTORNEY

United States Patent Office 2,759,127
Patented Aug. 14, 1956

2,759,127

LIGHTNING ARRESTOR

Helmuth W. Zuch and Harold A. Tankersley, Austin, and Ernest T. Ankele, Waco, Tex., assignors to said Zuch, said Tankersley, said Ankele and Howard W. Zuch, Austin, Tex., as copartners Application August 20, 1952, Serial No. 305,316

9 Claims. (Cl. 317—65)

This invention relates to lightning arrestors, and more particularly to the provision of a lightning arrestor designed to automatically re-set itself. The device of the invention is particularly intended for use in providing protection against overvoltage surges on high voltage applications, such as high voltage transmission lines.

It is an object of the invention to provide a lightning arrestor which can be automatically reloaded with a fuse carrying tube after a surge resulting from lightning.

A further object is to provide a lightning arrestor having adjustable strike gaps enabling the arrestor to be calibrated to the exact requirements of the equipment to be protected, regardless of the age of the insulation, or insulation impulse level values existing.

A further object is the provision of means for automatically counting the number of flash-overs during a given time simply by noting the number of the tube in a firing position.

A further object is to provide a lightning arrestor having simple means of rewinding a drive motor by means of a type of pole for manipulating disconnect switches as commonly used in power plants.

A further object is to provide a lightning arrestor arranged to be mounted readily in connection with all types of equipment, whether tank mounted, wall mounted, structure mounted, and the like.

A further object is to provide a lightning arrestor which can be automatically de-iced by using the expulsion resulting from lightning to break any ice formed in areas where ice might interfere with proper operation.

These and other objects are attained by the novel arrangement and construction of parts hereinafter described and claimed, and illustrated by the accompanying drawings, forming a part hereof, and in which:

Figure 1:
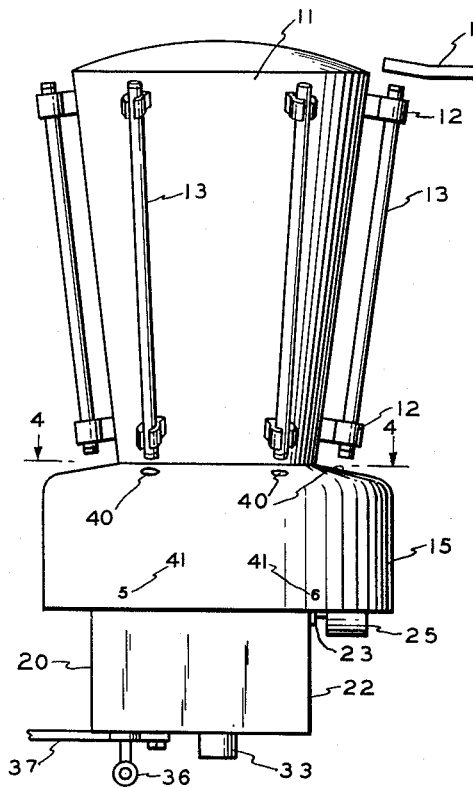
Fig. 1 is an elevational view of a lightning arrestor embodying the invention.
Figure 2:
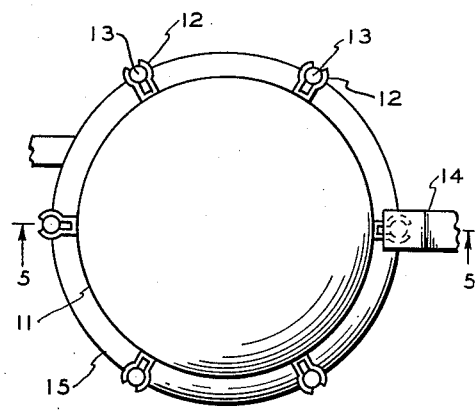
Fig. 2 is a plan view of the lightning arrestor.
Figure 3:
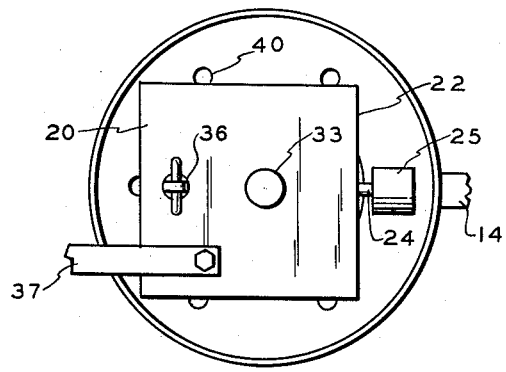
Fig. 3 is a bottom view of the lightning arrestor.
Figure 4:
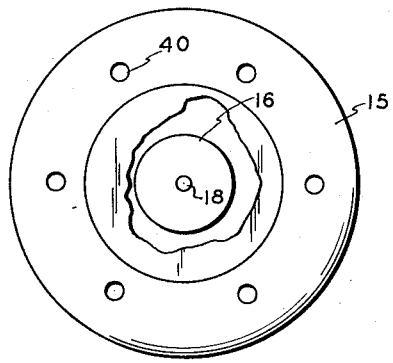
Fig. 4 is a sectional view taken on line 4—4 of Fig. 1.
Figure 5:
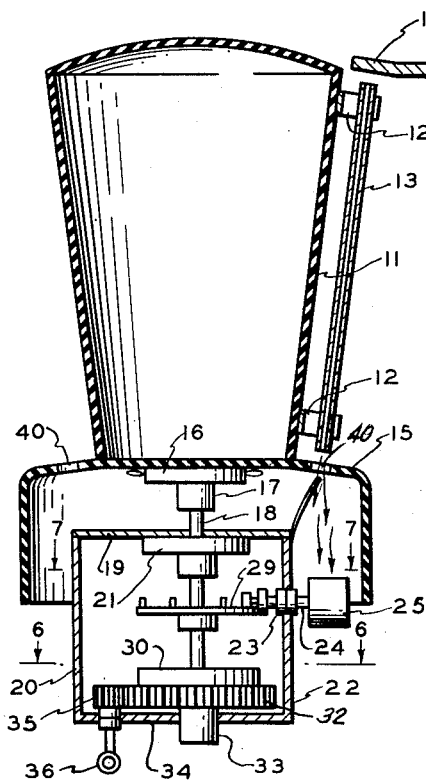
Fig. 5 is a sectional view taken on line 5—5 of Fig. 2.
Figure 6:
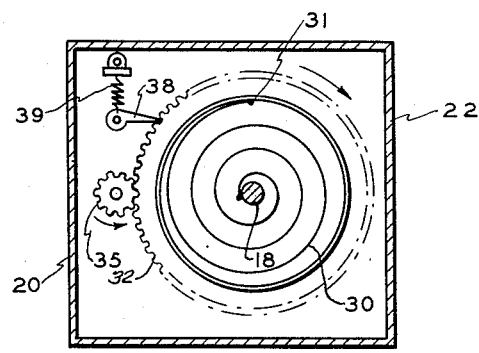
Fig. 6 is a sectional view taken on line 6—6 of Fig. 5.
Figure 7:
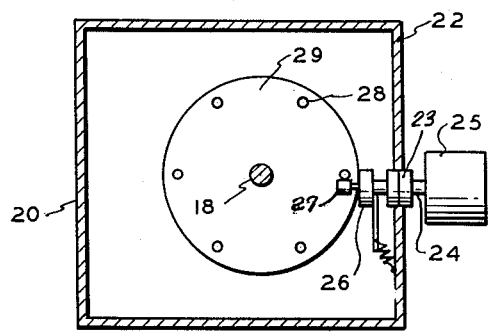
Fig. 7 is a sectional view taken on line 7—7 of Fig. 5.
Figure 8:
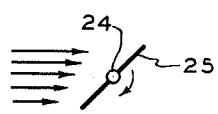
Fig. 8 is a view indicating the manner in which a blast of gases resulting from lightning rotates a target vane.

Referring to the drawings, in Figs. 1 through 8, the lightning arrestor is shown to comprise a downwardly tapered tube support 11, having attached to its upper and lower ends a plurality of spring clips 12 to receive expulsion tubes 13 in which are mounted fuse elements. The upper end of a tube 13 is positioned near a bar 14 leading to an energized conductor.

The bottom of support 11 is attached to the top of cylindrical body 15, both of which are made of a suitable plastic compound or other suitable insulating material having a high dielectric strength. The top of body 15 is attached to a plate 16 integral with a collar 17 secured to a shaft 18 passing through the top 19 of a metal casing 20.

Attached to shaft 18 is a plate 21 to maintain alinement. Mounted in side wall 22 of the casing is a bushing 23 through which passes a small shaft 24 having attached thereto a target vane 25. Also attached to shaft 24 is a flange 26 having a latch member 27 projecting therefrom, and arranged to engage pins 28 attached to and projecting upwardly from a plate 29 attached to shaft 18.

Also attached to shaft 18 is one end of a winding spring 30, the other end of the spring being attached at 31 to the inner wall of a large winding gear 32 integral with a stub shaft 33 passing rotatably through the bottom wall 34 of casing 20. In mesh with the gear 32 is a small gear 35 rotatably mounted in the wall 34 and controlled by a winding key 36 designed to receive the hook at the end of a pole commonly used for disconnecting switches carrying large currents. The entire assembly can be mounted on any suitable bracket 37, for tank mounting, wall mounting, structure mounting, and the like. A pawl 38 controlled by a spring 39 engages the large gear 32 to maintain tension of the spring 30.

In operation, a surge of lightning causes an arc at the top of an expulsion tube 13 and grounds through the casing 20. The particular tube affected is directly over opening 40, which is directly over the target vane 25. The tubes are numbered, for example, 1 to 6, as at 41, and there is an opening 40 for each in the top of the body 15. The arc causes current to flow through the expulsion tube and melt the fuse therein. The blast of the arc from both ends of the expulsion tube 13 extinguishes the arc, and the force downwardly of the arc blast rotates the target vane 25 to lift the latch 27 from engagement with the pin 28, allowing the plate 29 to be rotated by the spring 30, to bring another expulsion tube 13 and opening 40 directly over the target vane 25. The arrestor is now in condition to receive another surge of lightning and automatically position another expulsion tube 13 over the target vane 25.

From the above description it will be seen that there has been provided a simple and effective lightning arrestor adapted to automatically reset itself after lightning surge. Since the tubes 13 are numbered, the number of surges occurring in a given time can be easily determined by noting the number of the tube positioned over the target vane 25. The heat of the expulsion gases also breaks up any ice which might accumulate in certain areas.

The above description is to be considered as illustrative and not limitative of the invention of which modifications can be made without departing from the spirit and scope of the appended claims.

The invention having been described, what is claimed is:

1. In a lightning arrestor, a plurality of spaced expulsion tubes, a support for holding said plurality of spaced tubes about its periphery, each of the expulsion tubes having a fusible element positioned therein, a body attached to the support and having a plurality of openings beneath and in line with the tubes, a casing, a shaft rotatably mounted in the casing and connected to said body, a plate connected to the shaft and having a plurality of upwardly projecting pins, a latch arranged to engage one of the pins to prevent rotation of the plate, spring means to rotate the plate when the pin is disengaged from the latch, a target vane mounted directly below one of said openings, to be rotated by a blast due to a surge of lightning through the expulsion tube directly over the vane, said vane being connected to the latch to release the latch when a blast occurs, and spring means to return the latch to a pin engaging position after the occurrence of a blast.

2. In a lightning arrestor, a body having a plurality of spaced blast receiving openings in its upper surface, a plurality of spaced fuse-containing expulsion tubes supported by the body each tube directly above an opening, spring means mounted to rotate the body, a latch to normally prevent rotation of the body, actuator means actuated by impingment of a blast of gases due to a lightning surge to release the latch, and other means to return the latch to a position to prevent further rotation of the body in the absence of another blast.

3. The structure set forth in claim 2 further characterized by the body having an upstanding tapered support provided with a plurality of spaced spring clips for mounting said tubes.

4. The structure set forth in claim 2 further characterized by a shaft connected to said body, a plate attached to the shaft and having a plurality of upstanding pins for engagement with said latch, a rotatable stub shaft connected to the latch, and a target vane fixed to the stub shaft to be rotated by a blast from an expulsion tube due to a lightning surge therethrough to disengage the latch from a pin to allow the body to rotate.

5. The structure set forth in claim 2 further characterized by a shaft connected to said body, a spiral spring having one end connected to said shaft, a large gear to which the other end of the spring is connected, a casing, said large gear having a stub shaft journalled in the bottom of the casing, and means to rotate the large gear to wind the spring.

6. The structure set forth in claim 5 further characterized by said large gear rotating means comprising a small gear in mesh with the large gear and rotatably mounted on the bottom of the casing, and a pawl mounted on the casing and engaging the large gear to prevent rotation thereof in one direction.

7. The structure set forth in claim 6 further characterized by a winding key attached to the small gear, said key having a ring portion engageable by a hook to rotate the small gear.

8. In a lightning arrestor, a plurality of spaced expulsion tubes for expelling a blast of gases during a surge a support for holding said plurality of spaced expulsion tubes about its periphery, one of said expulsion tubes normally being positioned in series with a voltage discharge path, means for rotating said support, a chamber having an outlet in line with said one expulsion tube, a latch means for normally preventing rotation of said support, operating means in said chamber for said latch positioned adjacent the outlet of said expulsion tube in said voltage discharge path whereby a blast of gases from said discharge tube upon the occurrence of an overvoltage actuates said operating means to release said latch to permit a predetermined rotation of said support until the next expulsion tube is in line with said operating means and said discharge path.

9. The structure as set forth in claim 8 having said tubes numbered in rotative series to show the number of times an overvoltage discharge occurs thereby denoting which tubes are exhausted of fusible gas producing material.

References Cited in the file of this patent
UNITED STATES PATENTS

| | | |
|---|---|---|
| 441,999 | Wood | Dec. 2, 1890 |
| 455,955 | Vail | July 14, 1891 |
| 1,946,815 | Skipper | Feb. 13, 1934 |
| 2,006,179 | Price | June 25, 1935 |